Oct. 18, 1932. A. H. SWETT 1,883,088
FASTENER
Original Filed July 2, 1930
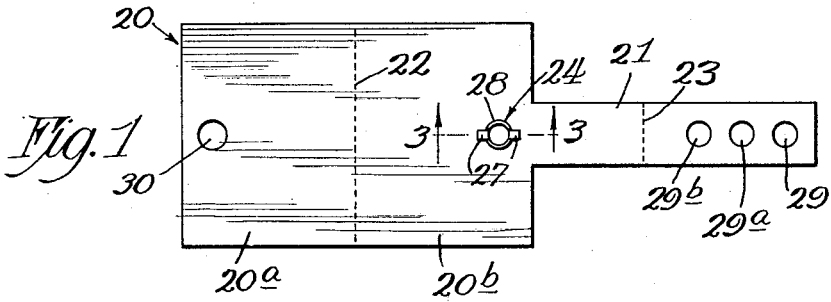
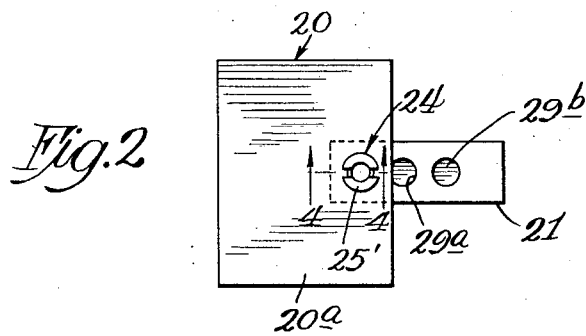
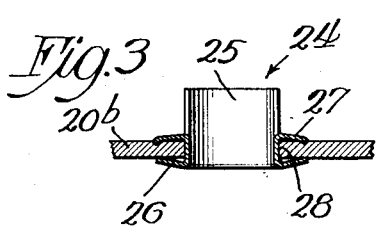 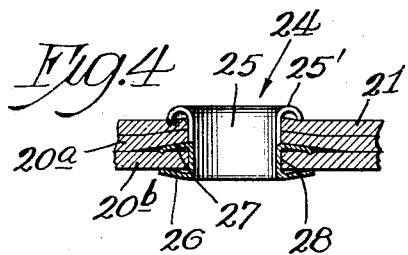
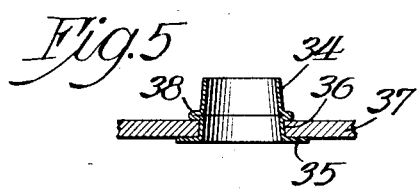 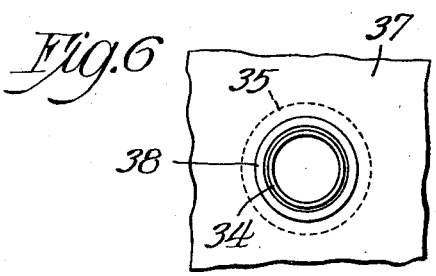
Inventor
Arthur H. Swett
By Rector, Hiblow, Davis & Macauley Attys.

Patented Oct. 18, 1932

1,883,088

UNITED STATES PATENT OFFICE

ARTHUR H. SWETT, OF CHICAGO, ILLINOIS

FASTENER

Original application filed July 2, 1930, Serial No. 465,294. Divided and this application filed April 11, 1931. Serial No. 529,347.

My invention relates to eyelet or tubular fasteners for securing objects or parts together. This application is a division of my co-pending application, Serial No. 465,294, filed July 2, 1930. As will be noted from the original application, this invention is well adapted for securing tags of the fold-over tongue type to articles which they are to identify, and for the purposes of illustration, I will refer particularly to the same as used in connection with such tag structure. However, it will be understood that my invention is not limited to such a structure, but is adaptable to any other use, wherein eyelets, rivets or fasteners of this type are desired.

One of the objects of my invention is to provide a novel rivet structure which includes a tubular barrel part having at one end a laterally-extending base part of substantial size, which base part is adapted to engage one side of the material of a tag or the like; and the tubular part is so formed that a part of the material forming the same is struck outwardly therefrom and adapted to be clinched down upon the side of the tag material opposite the rivet base to securely clamp the tag material between such struck-out part and the base. Such struck-out portion is so formed that an upstanding tubular part remains to be engaged with and clinched upon another part of the tag.

A further object is to provide a strong and durable rivet or fastener structure adapted to be attached to the tag or other object in such a way that it cannot be loosened and removed without so distorting the rivet and tag as to prevent further use of the same, the entire structure being of such character that any tampering or distortion of the same will be readily detected. The rivet structure is of sufficient rigidity and strength, and it is so shaped and attached so that the tag or other object must be practically torn apart in order to detach the rivet and tag sections.

Further objects are to provide rivet means for joining objects or sections thereof together, which rivet means is adapted to be permanently attached to a section of the object, with metal reinforcement on both sides of the object material around the opening in such material through which the rivet projects, thereby strengthening the object material at that point and tending to prevent tearing out of the same except under abnormal conditions; and to provide, more specifically, the tubular barrel portion with tangs cut therefrom and adapted to be pressed outwardly and downwardly to securely grip the object material to permanently attach the rivet to the object, or to strike from the tubular wall an annular horizontal flange for securely holding the rivet to the object,—the arrangement in both cases being such that, when the remaining upstanding tubular part is engaged with another object or portion of the same object and crimped, the turned-down tangs or flange is concealed and rendered inaccessible avoiding tampering in an attempt to detach the structure.

Another object is to provide an improved rivet fastener which has one part which can be initially secured to one section of a tag or other object, so as to prevent detachment therefrom, and another part exposed to permit a positive securement to another and exposed part of the same or another tag, thereby eliminating separate handling of the rivet by the user.

Other objects and advantages will become apparent as this description progresses and by reference to the drawing, wherein;

Figure 1 is a plan view of one form of tag structure with my invention applied thereto, the tag being shown in its open and unfolded or unattached condition;

Fig. 2 is a view showing the tag of Fig. 1 with its section folded and permanently secured together;

Fig. 3 is an enlarged vertical sectional view through the rivet structure shown in Figs. 1 and 2, and taken substantially on line 3—3 of Fig. 1;

Fig. 4 is an enlarged sectional view taken substantially on line 4—4 of Fig. 2;

Fig. 5 is a vertical sectional view, similar to Fig. 3, but showing another form of rivet structure embodying my invention, and Fig. 6 is a top plan view of the structure shown in Fig. 5.

The tag structure which I have chosen to illustrate my invention takes the form of a blank having a rectangularly-shaped body portion 20 with a narrow rectangularly-shaped tongue 21 projecting from one end thereof. The tag body may be creased as at 22, providing foldable sections 20ª and 20ᵇ, and the tongue 21 may be likewise creased for folding as at 23, whereby the entire tag structure may be folded in the manner and to the shape illustrated in Fig. 2.

This invention has to do particularly with rivet structures for securely fastening a tag of the foregoing character to various articles. One form of tubular rivet 24 embodying my invention is shown in Figs. 1 to 4, inclusive. This rivet is adapted to be permanently secured in an opening 28 formed in the tag body section 20ᵇ; and it has a tubular barrel 25 provided at one end with a laterally extending flange 26, constituting a base part of substantial width. This upstanding tubular part has tangs 27 struck from its vertical wall at, preferably, diametrically oposed points; and while I preferably employ two such tangs in this form, the number of the same may be varied, if desired, without departing from my invention. With this structure, the rivet may be permanently secured to the tag so that, when the same is delivered to the user, the rivet structure will constitute a part of the tag, eliminating the necessity and inconvenience of handling separate rivets, etc., as hereinbefore more particularly mentioned.

Any desired, and suitable, form of tool may be employed for the cutting out of the tangs 27. These tangs may, preferably, be cut out before the rivet is inserted in the tag opening 28, or the tubular rivet with uncut side walls may be first inserted in the opening and a proper tool then used which cuts and crimps and clamps the tangs in place as illustrated and described. In securing the rivet to the tag, its barrel portion 25 is passed through the opening 28, whereupon the tangs are forced outwardly and downwardly upon the surface of the tag material as best illustrated in Figs. 3 and 4. The tangs are pressed firmly down and permanently act, and during this action, the base portion 26 serves as a die-like part for effecting the proper clinching or crimping of the tangs 27. In this manner the tag material is tightly gripped between the tangs 27 and base 26, and the tag material around the opening 28 is reenforced making it practically impossible to detach the rivet from the tag without so distorting both the rivet and the tag as to render the same of no further use. This metal reenforcement attachment strengthens the tag structure as a whole, making the same more nearly foolproof and temper-proof in its article-attached position as is quite desirable.

After the rivet has been fixed in place, the tag structure is ready for use by the merchant, or other user, who carries the same in stock in the condition illustrated in Fig. 1, until he is ready to attach it to the article to be identified. When the user attaches the tag, the tag tongue 21 is loop-engaged with some suitable part of the article in such a way that its free end may turn back to bring one of the openings 29, 29ª, and 29ᵇ into coincidence with the upstanding tubular portion 25 of the rivet, which tubular portion is then passed through the aligned opening. The tag section 20ª is next folded over to the position shown in Fig. 2, so that the tubular portion 25 of the rivet may be projected through the opening 30. When the parts are thus engaged, a suitable clinching or crimping tool, of any well-known form, may be applied to the fastening structure to clinch the outer projecting tubular portion thereof to the position or condition indicated at 25' in Fig. 4. Thus the tag sections 20ª, 20ᵇ and the tongue are all securely interlocked, and the walls of the rivet which have been clinched are sufficiently rigid to prevent unclinching of the same for removal of these parts. The parts are so firmly secured together that they cannot be separated without either tearing the tag material or so distorting the same or the rivet that such tampering may be readily detected and the merchant or user consequently protected as intended.

It will be noted that with this arrangement, the rivet structure is of tubular form having at least three lateral projecting portions (when finally clinched) which are in substantially vertical alignment with each other and so related as to firmly hold the several fastened sections of the tag, to support all of the openings through which the rivet passes to more positively prevent unauthorized detachment. In the crimping of the outer portion of the tubular barrel part 25' the base portion 26 and down-turned or clinched tangs 27 provide additional die-like supporting surfaces for the clinching action, insuring the proper uniform and rigid crimp action which is quite essential for best securement to the tag sections. Further, with this arrangement, uniform association of the crimped tubular barrel part 25' and the base part 26 with the tag sections provides structure which will withstand greater pull action as against these parts without tearing than has heretofore been achieved with prior structures.

In Figs. 5 and 6, I have shown another form of rivet embodying my invention. This form, like that of Figs. 3 and 4, is provided with a tubular barrel part 34 and an annular base part 35 extending laterally from the lower edge thereof. To secure this rivet in place, it is inserted through the opening 36 in the tag material 37 and a tool of suitable form is then employed to crimp the tubular side wall at an intermediate point, or to double it on itself in such a way as to form a laterally-projecting annular flange 38 which, when fully in form, engages the side of the tag material opposite the rivet base 35. This provides on both sides of the tag material around the opening 36, an annular gripping flange or ring which greatly strengthens the structure as a whole as hereinbefore more particularly mentioned in connection with the form of Figs. 3 and 4. In the mounting of this form of rivet, the base portion 35 also serves as a die-support for the forming of the annular holding ring 38.

While I have described two different forms of rivet structure, it will be understood that changes in details may be made without departing from the spirit and scope of my invention. It will also be understood that although I have described my invention as used in connection with a tag or other identification medium, I do not desire to be limited to such use, as this device can readily be adapted to any other object where similar advantages are sought.

I claim:

1. A tubular rivet of the character described which comprises an annular base part with a tubular part extending therefrom at substantially right angles, and strips cut from the longitudinal wall surface of said tubular part leaving an upstanding tubular part, said strips being adapted to be forced outwardly and downwardly toward said base part to permanently fix said rivet in place upon an object with its upstanding tubular part free for attachment by further deformation.

2. A tubular rivet of the character described which comprises an annular base part with a tubular part extending therefrom at substantially right angles, and strips cut at intervals from the free end edge of the longitudinal wall surface of said tubular part to adjacent said base part leaving an upstanding tubular part, said strips being adapted to be forced outwardly and downwardly toward said base part to permanently fix said rivet in place upon an object with its upstanding tubular part free for attachment to the same or another object by further deformation.

3. A fastener of the class described, comprising an integral upstanding tubular body portion, a base, a strip cut from said upstanding tubular body portion, said strip being adapted when crimped to rigidly and firmly secure between it and the base an object to which it is adapted to be fastened, the upstanding tubular part of said body portion also being adapted to be crimped down toward said base to retain between said crimped tubular part and the crimped strip the object to which it is fastened.

4. A fastener of the class described adapted to be secured to an object, and comprising a tubular body portion, a base integral with said body portion, tangs formed from said body portion and adapted when pressed toward said base to retain the material of the object between said tangs and said base, the upstanding body portion being also adapted to be crimped to retain another part of the same object, or a part of a different object, independent of the fastener-attachment to the first-mentioned object.

ARTHUR H. SWETT.